United States Patent [19]

Watanabe et al.

[11] Patent Number: 4,968,648
[45] Date of Patent: Nov. 6, 1990

[54] HEAT-RESISTING PHOSPHATE BASED COMPOUND SINTERED BODIES AND PRODUCTION THEREOF

[75] Inventors: Keiichiro Watanabe; Tsuneaki Ohashi, both of Nagoya; Tadaaki Matsuhisa, Kasugai, all of Japan

[73] Assignee: NGK Insulators, Ltd., Japan

[21] Appl. No.: 379,676

[22] Filed: Jul. 10, 1989

Related U.S. Application Data

[63] Continuation of Ser. No. 116,063, Oct. 19, 1987, abandoned.

[30] Foreign Application Priority Data

Aug. 29, 1987 [JP] Japan ................... 62-215836

[51] Int. Cl.$^5$ ............................................. C04B 35/48
[52] U.S. Cl. .................................... 501/104; 501/103; 501/102
[58] Field of Search ..................... 501/102, 103, 104

[56] References Cited

FOREIGN PATENT DOCUMENTS 3609730 9/1986 Fed. Rep. of Germany ........ 35/480
88-07028 9/1988 World Int. Prop. O. .

OTHER PUBLICATIONS

S. Y. Limaye, D. K. Agrawal and H. A. McKinstry, "Synthesis and Thermal Expansion of $MZr_4P_6O_{24}$(M=Mg, Ca, Si, Ba)", Journal of the American Ceramic Society, vol. 70, No. 10, C232–236, (1987).

*Primary Examiner*—Karl Group
*Attorney, Agent, or Firm*—Arnold, White & Durkee

[57] ABSTRACT

Heat-resisting phosphate based compound sintered bodies are disclosed, which each contain not less than 10% by weight of a crystalline phase of $RZr_4(PO_4)_6$ in which R is an element in Group IIa of the Periodic Table. A weight-reduced percentage of the sintered body when being thermally treated at 1,400° C. for 100 hours is not more than 10%. A process for producing such phosphate based compound sintered bodies is also disclosed.

14 Claims, 4 Drawing Sheets

FIG_1

FIG_2

FIG._5
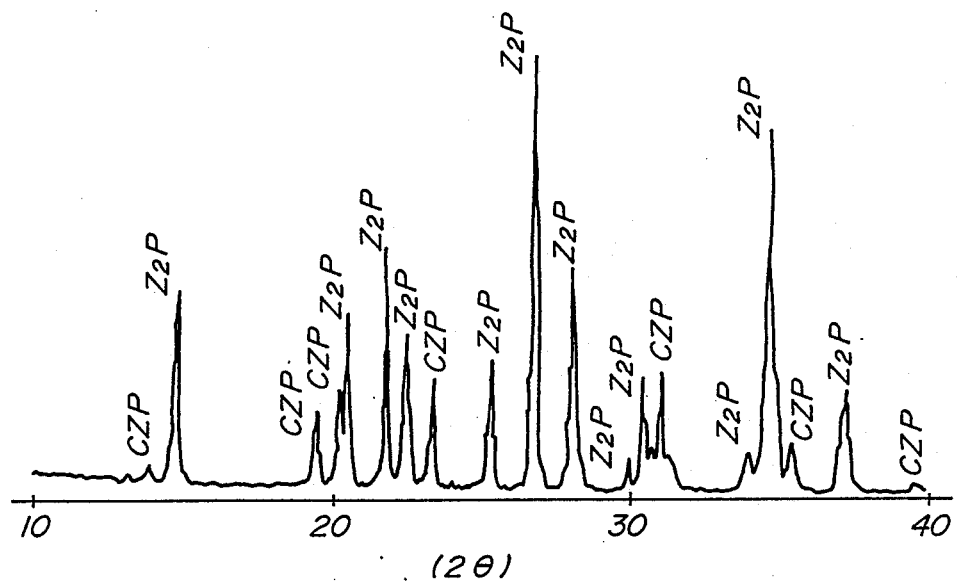
FIG._6
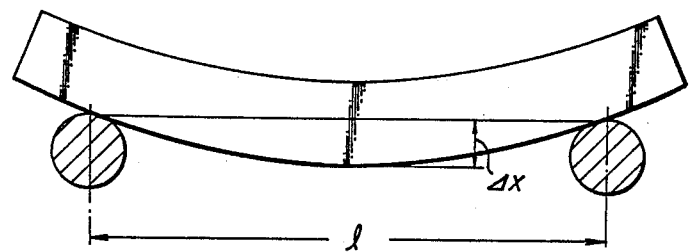

HEAT-RESISTING PHOSPHATE BASED COMPOUND SINTERED BODIES AND PRODUCTION THEREOF

This is a continuation of application Ser. No. 07/116,063 filed Oct. 19, 1987, now abandoned.

BACKGROUND OF THE INVENTION (1) Field of the Invention

The present invention relates to heat-resisting phosphate based compound sintered bodies and production thereof. More particularly, the invention relates to phosphate based compound sintered bodies having excellent heat resistance and low expansion as well as excellent high temperature stability, and to a process for producing the same.

(2) Related Art Statement

With recent progress in industrial technologies, demands for materials having excellent heat resistance and low expansion have increase.

As a result of these demands, it has been realized that zirconyl phosphate $[(ZrO)_2P_2O_7]$ is promising as a material having excellent heat resistance and low expansion.

Further, zirconium phosphates of alkali metals such as sodium have been proposed as materials having heat resistance and low coefficients of thermal expansion [Mat. Res. Bull., Vol. 19, pp. 1451~1456 (1984); Journal of Materials Science 16, 1633~1642 (1981); and Ceramics Association Report 95(5), pp.531 to 537(1987)].

Furthermore, with respect to calcium (Ca) among alkaline earth metals, calcium phosphate based compounds having special compositions have been proposed as materials with low expansion (Mat. Res. Bull., Vol. 20, pp 99~106, 1985).

However, although the above phosphate compounds such as zirconyl phosphate have a merit of excellent low expansion, these phosphate compounds have a common problem that they are thermally decomposed at high temperatures not lower than 1,200° C. to evaporate a phosphorus component. For instance, when zirconyl phosphate is thermally treated at 1,400° C. for 100 hours, it exhibits a weight reduction by as much as 19%.

On the other hand, in order to produce phosphate compounds, there are known processes using combinations of $Na_2CO_3$, $ZrO_2$, $ZrOCl_2 \cdot 8H_2O$, $SiO_2$, $(NH_4)_2HPO_4$, $H_3PO_4$, $Nb_2O_5$, $Y_2O_3$, $SrCO_3$, $K_2CO_3$, $CaCO_3$ and/or the like [T. Oota and I. Yamai, Journal of the American Ceramic Society, 69, 1, (1986)].

However, in the above producing processes, a $P_2O_5$ component is produced alone during decomposition of ammonium phosphate or $H_3PO_4$ so that portions of a high concentration of phosphorus are locally formed to produce a low melting point compound during sintering. Consequently, large pores (spaces) are formed in the sintered bodies, thereby causing serious defects.

SUMMARY OF THE INVENTION

In order to solve the above-mentioned problems possessed by the prior art techniques, the present inventors have made various investigations and found that firing under addition of certain kinds of additives is effective to restrain weight decrease due to evaporation of a phosphorus component and that a given crystalline phase is formed in the sintered body in that case. As a result, the present inventors have accomplished the present invention.

That is, according to a first aspect of the present invention, there is a provision of heat-resisting phosphate based compound sintered bodies which each contain not less than 10% by weight of a crystal-line phase of $RZr_4(PO_4)_6$ (R being an element in Group IIa of Periodic Table), wherein a weight-reduced percentage is not more than 10% by weight when each of the sintered bodies is thermally treated at 1,400° C. for 100 hours.

According to a second aspect of the present invention, there is provision of a process for producing heat-resisting phosphate based compound sintered bodies, which comprises the steps of molding a batch mixture of materials selected from $ZrP_2O_7$, $(ZrO)_2P_2O_7$, $ZrO_2$, a phosphate of R, and RO (R being an element in Group IIa of Periodic Table), and firing a thus obtained molding.

These and other objects, features and advantages of the invention will be well appreciated upon reading of the following description of the invention when taken in conjunction with the attached drawings, with the understanding that some modifications, variations and changes of the same could be made by the skilled in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 5 is a diagram showing an X-ray diffraction pattern of a phosphate based compound of Example 3; and FIG. 6 is a view illustrating a method of measuring a self-weight softening percentages.

DETAILED DESCRIPTION OF THE INVENTION

Figure 1:
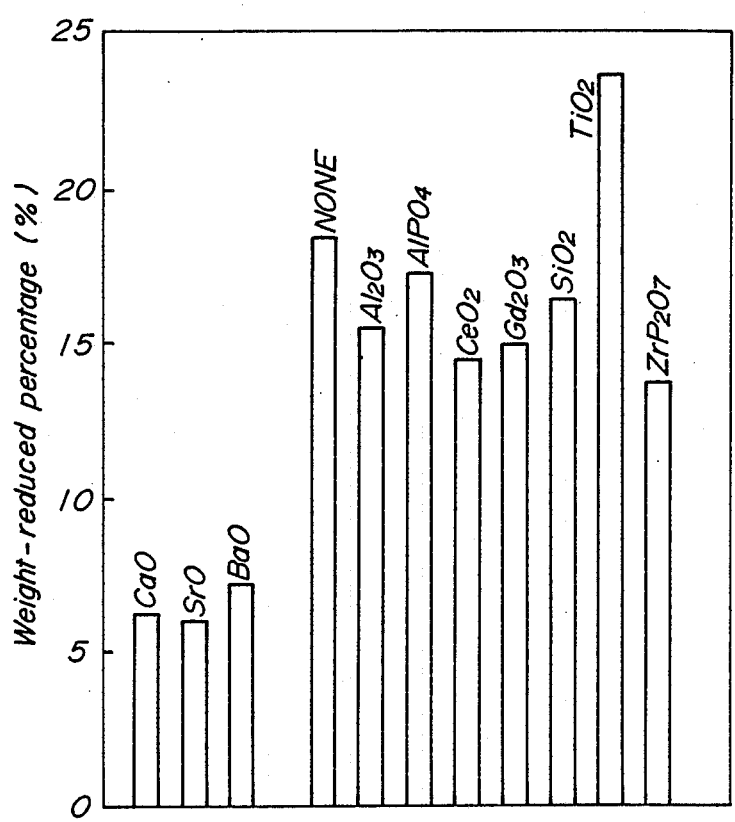
FIG. 1 is a diagram showing the relation between various kinds of oxides included into phosphate based compound sintered bodies and the weight-reduced percentage in thermal treatment at 1,400° C. for 100 hours.

In the phosphate based compound sintered bodies according to the present invention, it is necessary that a crystalline phase expressed by a general formula: $RZr_4(PO_4)_6$ is contained in the sintered bodies. As shown in the following explanation, thermal stability at high temperatures greatly depends upon the presence or absence of this crystalline phase.

Further, although R denotes an element belonging to Group IIa in Periodic Table, it is preferable to use one kind of barium (Ba), strontium (Sr) and calcium (Ca).

Furthermore, according to the sintered bodies of the present invention, the weight-reduced percentage due to evaporation of the phosphorus component after thermal treatment at 1,400° C. for 100 hours can be suppressed to as low a value as not more than 10% and the flexural strength is increased to not less than 100 kg/cm$^2$ when the open porosity is not more than 50%. That is, if the open porosity is over 50%, flexural strength is less than 100 kg/cm$^2$ which does not meet an indispensable strength requirement in case that ceramics are used as actual members. Further, the self-weight softening percentages of the above sintered bodies after the thermal treatment at 1,400° C. for 5 hours are not more than 0.3%. Thus, the sintered bodies of the present invention meet requirements as heat-resisting materials in that case.

In the sintered bodies according to the present invention, the dimensional change percentage is small, and not more than 1% when the sintered bodies are thermally treated at 1,400° C. for 100 hours. Thus, the requirements as heat-resisting materials are also satisfied.

In addition, the coefficient of thermal expansion of the sintered bodies according to the present invention is as low as not more than $25 \times 10^{-7}$/° C. in a temperature range from room temperature to 1,400° C. Thus, the sintered bodies have excellent thermal shock resistance. Accordingly, the sintered bodies according to the present invention having the above-mentioned properties may favorably be applied to materials required to have heat resistance and high temperature thermal stability, such as ceramic honeycomb structural bodies, for instance, automobile waste gas purifier catalyst carriers, rotary heat regenerating type ceramic heat exchangers, heat transmission heat exchangers, heat insulating materials for turbocharger rotor-housings and engine manifolds, and the like.

The process for producing the heat-resisting phosphate based compound sintered bodies according to the present invention is characterized in that a batch mixture of materials selected from $ZrP_2O_7$, $(ZrO)_2P_2O_7$, $ZrO_2$, a phosphate of R, and RO (R being an element in Group IIa in Periodic Table) is used as a starting material. That is, $ZrP_2O_7$, $(ZrO)_2P_2O_7$, $ZrO_2$, the phosphate of R, and RO are all stable compounds, which hardly cause ununiformity during molding and firing and which can be fired at high temperatures. Thus, they can provide ceramics having excellent heat resistance.

On the other hand, if conventionally employed phosphoric acid is used as a $P_2O_5$ source, phosphoric acid, which is a liquid, causes ununiformity during mixing. Thus, as mentioned in the above, portions having a higher concentration of phosphorus are locally formed to produce a compound of a low melting point. For this reason, a serious defect occurs that large pores are formed in the sintered body around the low melting point compound. When honeycomb structural bodies are to be obtained by extruding a body containing phosphoric acid, an extrusion die or a cylinder in an extruder rusts or corrodes due to corrosiveness of phosphoric acid, thereby extremely hindering molding. Further, when such a body is used in pressing, it is essentially impossible to mold the body as a powder due to phosphoric acid.

Ordinarily, formulating proportions of $ZrP_2O_7$, $(ZrO)_2P_2O_7$, $ZrO_2$, a phosphoric acid of R and RO are 0 to 73% by weight, 0 to 98% by weight, 0 to 17% by weight, 0 to 11% by weight, and 0 to 15% by weight, respectively. Among them, it is necessary to always include one of $ZrP_2O_7$ and $(ZrO)_2P_2O_7$ as well as RO or the phosphate of R into a batch mixture.

As RO in the starting components, stable compounds such as an hydroxide, a carbonate, a sulfate, etc. which are converted to RO, i.e., an oxide during the firing may be selectively used.

The average grain size of the starting materials to be used is ordinarily not more than 50 μm, and preferably not more than 10 μm.

As the firing conditions for the sintered bodies according to the present invention, the firing temperature is not less than 1,400° C. and preferably from 1,400° C. to 1,800° C., while the firing time is 1 to 24 hours and preferably 2 to 10 hours. When the firing temperature is not less than 1,400° C., the phosphate based compound sintered bodies containing not less than 10% by weight of $RZr_4(PO_4)_6$ as the crystalline phase according to the present invention will be obtained. Further, if the firing time is less than 1 hour, the sintering is insufficient, while it exceeds 24 hours, strength lowers due to abnormal grain growth and a different phase precipitates due to evaporation of the phosphorus component.

The present invention will be explained with reference to specific examples in the following. However, they are merely illustrative of the invention, but should never be interpreted to limit the scope of the invention.

EXAMPLES 1~11 AND COMPARATIVE EXAMPLES 12~21:

Zirconyl phosphate $[(ZrO)_2P_2O_7]$ having the grain size adjusted, $ZrP_2O_7$, calcium carbonate, strontium carbonate, barium carbonate, aluminum phosphate, alumina, ceria, gadolinium oxide, titania, silica, calcium phosphate, and/or zirconia were mixed together according to the formulating recipe in Table 1. The grain size of the zirconyl phosphate was adjusted by using a vibration mill filled with $ZrO_2$ sintered grinding $ZrO_2$ media having about 5 mm in diameter. The grain size may also be adjusted by using a pot mill or an attrition mill. $ZrO_2$ sintered grinding media stabilized with MgO or $Y_2O_3$ were used. The chemical composition of the grinding media used are shown in Table 2. Chemical anlysis values of the starting materials used are shown in Table 3.

Five parts by weight of a 10% PVA aqueous solution was added to 100 parts by weight of the thus formulated mixture shown in Table 1, which was fully mixed, pressed in a mold of $25 \times 80 \times 6$ mm at a pressure of 100 kg/cm$^2$, and rubber pressed at a pressure of 2 tons/cm$^2$, followed by drying. The thus dried molding was fired in air in an electric furnace under conditions shown in Table 1. A heating rate was from 5 to 1,700° C./hr. After the firing, the obtained sintered body was worked into a flexural strength test piece having $3 \times 4 \times 40$ mm shown in JIS R 1601 (1981), and a weight-reduced percentage and a dimensional change percentage in a thermal treatment at 1,400° C. for 100 hours, a coefficient of thermal expansion in a temperature range from 40 to 1,400° C., a four point flexural strength, a self-weight softening amount, an open porosity, and a melting point were measured. The coefficient of thermal expansion was measured by means of a push rod type differential dilatometer using a high purity alumina sintered body. A measuring temperature range was from 40 to 1,400° C. The four point bending strength was measured by a method shown in JIS R 1601. The self-weight softening percentage was determined by the following equation through placing the above flexural strength test piece of $3 \times 4 \times 40$ mm on supports at a span $l=30$ mm shown in FIG. 6, thermally treating it in air at 1,400° C. for 5 hours, and measuring a self-weight deformation amount $\Delta x$. Self-weight softening percentage $= \Delta x/1 \times 100(\%)$ The open porosity was measured according to an Archmedian process. The melting point was determined by observing whether a sintered body cut in a shape of $3 \times 4 \times 5$ mm was melted or not when it was thermally treated at 1,650° C. for 10 minutes in an electric furnace. Further, amounts of crystalline phases in the sintered body were quantitatively determined by using a reflection peak value at a (200) face of zirconyl phosphate [$\beta$-$(ZrO)_2P_2O_7$] [Communications of the American Ceramic Society, C-80 (1984)], a reflection peak value at a (113) Plane of JCPDS 33-321 of $CaZr_4(PO_4)_6$, a reflection peak value at a (113) Plane of JCPDS 33-136 of $SrZr_4(PO_4)_6$, a reflection peak value at a (113) Plane of JCPDS 34-95 of $BaZr_4(PO_4)_6$, and a reflection peak value at a (001) of JCPDS 34-95 of m-$ZrO_2$. Since a relative strength of the reflection at the (001) face of m-$ZrO_2$ is as low as 18/100, a value five time this strength was used as a peak value. With respect to the other different kinds of crystalline phases, presence or absence thereof only were identified by the x-ray diffraction pattern. In Table 1, "strong" means that a peak intensity of a crystalline phase concerned in an X-ray diffraction pattern is strong, that is, a great amount of that crystalline phase is present.

TABLE 1

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Formulating proportions (wt. %) | | | | | | | | | | | |
| $(ZrO)_2P_2O_7$ | 98.0 | 95.0 | 98.0 | 95.0 | 95.0 | 35.8 | 34.2 | 37.5 | | 53.1 | |
| $ZrP_2O_7$ | | | | | | 50.4 | 48.1 | 52.8 | 72.5 | 36.3 | 74.6 |
| $CaCO_3$ | | | 2.0 | 5.0 | | | | 9.7 | | | |
| $SrCO_3$ | 2.0 | 5.0 | | | | 13.8 | | | | | 13.8 |
| $BaCO_3$ | | | | | 5.0 | | 17.7 | | | | |
| $ZrO_2$ | | | | | | | | | 16.9 | | 11.6 |
| $Ca_2P_2O_8$ | | | | | | | | | | 10.6 | 10.6 |
| Crystalline phase (wt. %) | | | | | | | | | | | |
| $CaZr_4(PO_4)_6$ | | | 20 | 47 | | | | 100 | 100 | 100 | |
| $SrZr_4(PO_4)_6$ | 13 | 32 | | | | 100 | | | | | 100 |
| $BaZr_4(PO_4)_6$ | | | | | 24 | | 100 | | | | |
| $(ZrO)_2P_2O_7$ | 87 | 62 | 80 | 44 | 68 | | | | | | |
| m-$ZrO_2$ | | 6 | | 9 | 8 | | | | | | |
| other | | | | | | | | | | | |
| Firing conditions | | | | | | | | | | | |
| firing temperature (°C.) | 1,600 | 1,500 | 1,600 | 1,400 | 1,800 | 1,600 | 1,600 | 1,500 | 1,600 | 1,600 | 1,600 |
| keeping time (h) | 5 | 10 | 5 | 24 | 1 | 5 | 5 | 10 | 5 | 5 | 5 |
| Firing shrinkage (%) | 19.2 | 18.1 | 19.1 | 13.8 | 18.7 | 17.1 | 9.9 | 13.8 | 15.5 | 14.9 | 15.6 |
| Characteristics of sintered body | | | | | | | | | | | |
| open porosity (%) | 2.5 | 8.1 | 3.7 | 19.5 | 3.3 | 9.9 | 27.6 | 20.6 | 15.2 | 36.0 | 32.0 |
| flexural strength (kg/cm$^2$) | 750 | 650 | 450 | 320 | 550 | 640 | 340 | 220 | 450 | 210 | 250 |
| weight-reduced percentage (%, 1400° C. × 100 h) | 8.6 | 6.0 | 7.0 | 6.2 | 7.2 | 0.6 | 2.4 | 3.0 | 2.8 | 3.2 | 1.0 |
| dimensional change percentage (%, 1400° C. × 100 h) | −0.77 | −0.35 | −0.29 | −0.25 | −0.17 | −0.25 | −0.22 | −0.29 | −0.21 | −0.26 | −0.22 |
| self-weight softening percentage (%, 1400° C. × 5 h) | — | — | — | — | — | 0.01 | 0.00 | 0.03 | 0.02 | 0.03 | 0.01 |
| coefficient of thermal expansion (× $10^{-7}$/°C., RT-1400° C.) | 11 | — | 2 | — | 5 | 25 | — | −12 | — | — | — |
| melting point (°C.) | — | >1,650 | — | — | — | >1,650 | >1,650 | >1,650 | — | — | — |

| | Comparative Example | | | | | | | | | |
|---|---|---|---|---|---|---|---|---|---|---|
| | 12 | 13 | 14 | 15 | 16 | 17 | 18 | 19 | 20 | 21 |
| Formulating proportions (wt. %) | | | | | | | | | | |
| $(ZrO)_2P_2O_7$ | 100 | 98.0 | 37.5 | 95.0 | 95.0 | 95.0 | 9.50 | 95.0 | 95.0 | 95.0 |
| $ZrP_2O_7$ | | | 52.8 | | | | | | | 5.0 |
| $CaCO_3$ | | | 9.7 | | | | | | | |
| $SrCO_3$ | | | | | | | | | | |
| $BaCO_3$ | | 2 | | | | | | | | |
| other | | | | $Al_2O_3$:5.0 | $AlPO_4$:5.0 | $CeO_2$:5.0 | $Gd_2O_3$:5.0 | $SiO_2$:5.0 | $TiO_2$:5.0 | |
| Crystalline phase (wt. %) | | | | | | | | | | |
| $CaZr_4(PO_4)_6$ | | | 100 | | | | | | | |
| $SrZr_4(PO_4)_6$ | | 9 | | | | | | | | |
| $BaZr_4(PO_4)_6$ | 100 | 91 | | strong | strong | strong | strong | strong | strong | strong |
| $(ZrO)_2P_2O_7$ | | | | | | | | | | |
| m-$ZrO_2$ | | | | $AlPO_4$ | $ZrP_2O_7$ | $CePO_4$ | unknown | $ZrP_2O_7$ | $TiO_2$ | $ZrP_2O_7$ |
| other | | | | | $AlPO_4$ | | | | | |
| Firing conditions | | | | | | | | | | |
| firing temperature (°C.) | 1,600 | 1,600 | 1,350 | 1,600 | 1,600 | 1,600 | 1,600 | 1,600 | 1,600 | 1,600 |
| keeping time (h) | 5 | 5 | 5 | 5 | 5 | 5 | 5 | 5 | 5 | 5 |
| Firing shrinkage (%) | 18.5 | 19.1 | 12.8 | 18.3 | 19.7 | 20.2 | 20.1 | 18.8 | 18.2 | 19.4 |
| Characteristics of sintered body | | | | | | | | | | |
| open porosity (%) | 4.1 | 2.1 | 21.7 | — | — | — | — | — | — | — |
| flexural strength (kg/cm$^2$) | 500 | 610 | 260 | — | — | — | — | — | — | — |
| weight-reduced percentage (%, 1400° C. × 100 h) | 18.5 | 15.5 | 11.4 | 15.5 | 17.3 | 14.5 | 15.0 | 16.5 | 23.6 | 13.8 |
| dimensional change percentage (%, 1400° C. × 100 h) | −1.42 | −1.10 | −5.62 | −1.26 | −1.32 | −1.14 | −0.85 | −1.55 | −2.67 | −1.35 |
| self-weight softening percentage | 0.01 | — | 0.01 | — | — | — | — | — | — | — |

TABLE 1-continued

| (%, 1400° C. × 5 h) | | | | | | | | | | |
|---|---|---|---|---|---|---|---|---|---|---|
| coefficient of thermal expansion ($\times 10^{-7}$/°C., RT-1400° C.) | 4 | — | — | — | — | — | — | — | — | — |
| melting point (°C.) | >1,650 | — | — | — | — | — | — | — | — | — |

TABLE 2

| | MgO-stabilized $ZrO_2$ grinding media | $Y_2O_3$-stabilized $ZrO_2$ grinding media |
|---|---|---|
| $SiO_2$ | 0.28 | <0.05 |
| $Al_2O_3$ | 0.037 | <0.02 |
| $Fe_2O_3$ | 0.14 | 0.10 |
| $TiO_2$ | 0.12 | <0.01 |
| CaO | 0.29 | <0.005 |
| MgO | 3.37 | 0.007 |
| $K_2O$ | 0.010 | <0.005 |
| $Na_2O$ | 0.047 | <0.01 |
| $Y_2O_3$ | — | 5.04 |
| $ZrO_2$ | 94.19 | 92.90 |
| $HfO_2$ | 1.65 | 2.11 |
| Total | 100.13 | 100.16 |

TABLE 3

| | Chemical analysis values | | | | | | | | | | | | | | Average grain size (μm) |
|---|---|---|---|---|---|---|---|---|---|---|---|---|---|---|---|
| | $ZrO_2$ | $P_2O_5$ | $SiO_2$ | $Al_2O_3$ | MgO | CaO | NaKO | Ig, loss | $Fe_2O_3$ | SrO | BaO | $CeO_2$ | $Gd_2O_3$ | $TiO_2$ | |
| $(ZrO)_2P_2O_7$ | .61.85 | 36.38 | <0.2 | 0.01 | 0.45 | 0.02 | 0.01 | 3.20 | <0.01 | — | — | — | — | — | 0.9 |
| $ZrP_2O_7$ | 46.44 | 52.24 | 0.02 | <0.01 | <0.01 | <0.01 | <0.01 | 2.86 | <0.01 | — | — | — | — | — | 1.0 |
| $AlPO_4$ | <0.01 | 55.60 | <0.01 | 41.86 | 0.01 | 0.01 | 0.03 | 2.60 | <0.01 | — | — | — | — | — | 2.0 |
| Alumina | <0.01 | <0.01 | 0.013 | 99.17 | 0.002 | 0.022 | 0.342 | 0.08 | 0.015 | — | — | — | — | — | 4.0 |
| $CaCO_3$ | — | — | — | — | — | 55.72 | <0.01 | 43.78 | <0.01 | — | — | — | — | — | 2.2 |
| $SrCO_3$ | — | — | 0.001 | <0.001 | 0.001 | 0.11 | 0.012 | 30.15 | 0.018 | 69.61 | — | — | — | — | 0.6 |
| $BaCO_3$ | — | — | — | — | — | — | — | 22.30 | <0.01 | — | 76.50 | — | — | — | 10.0 |
| $CeO_2$ | — | — | 0.01 | 0.001 | <0.001 | 0.005 | — | 0.06 | <0.001 | — | — | 99.62 | — | — | 1.6 |
| $Gd_2O_3$ | — | — | — | — | — | <0.001 | — | — | <0.001 | — | — | <0.005 | 99.9 | — | 0.6 |
| $SiO_2$ | — | — | 99.68 | 0.07 | 0.018 | <0.002 | <0.005 | 0.07 | 0.038 | — | — | — | — | 0.004 | 1.0 |
| $TiO_2$ | — | — | 0.07 | 2.10 | <0.01 | <0.01 | <0.01 | 0.66 | <0.01 | — | — | — | — | 97.09 | <1.0 |
| $Ca_3(PO_4)_2$ | — | 45.53 | 0.01 | 0.02 | — | 53.97 | 0.01 | 0.10 | <0.01 | — | — | — | — | — | 2.0 |
| $ZrO_2$ | 98.65 | — | 0.06 | 0.01 | 0.01 | 0.04 | 0.02 | 0.38 | <0.01 | — | — | — | — | 0.15 | 0.9 |

Figure 2:
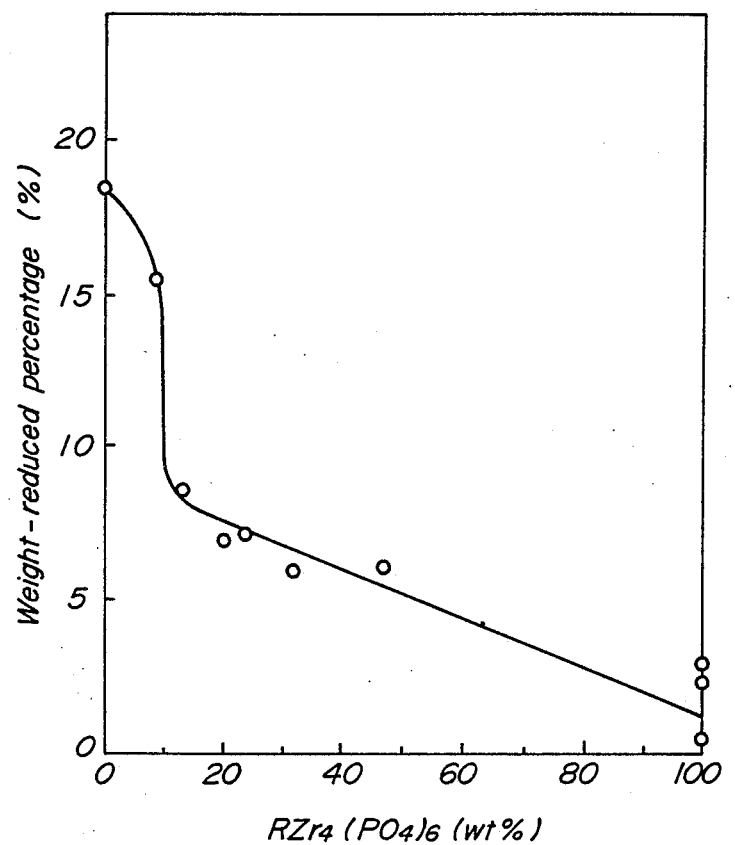
FIG. 2 is a diagram showing the relation between an amount of a crystalline phase of $RZr_4(PO_4)_6$ in phosphate based compound sintered bodies and the weight-reduced percentage during thermal treatment at 1,400° C. for 100 hours.
Figure 3:
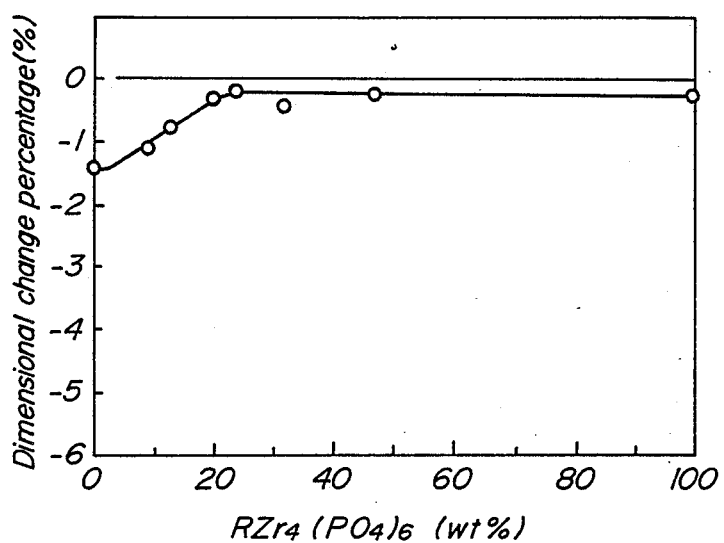
FIG. 3 is a diagram showing the relation between the amount of the crystalline phase of $RZr_4(PO_4)_6$ in phosphate based compound sintered bodies and the dimensional change percentage during thermal treatment at 1,400° C. for 100 hours.

As obvious from results in Examples 1 to 11 and Comparative examples 12 to 21, the phosphate based compound sintered bodies having the weight-reduced percentages being not more than 10% during the thermal treatment at 1,400° C. in air for 100 hours as intended in the present invention could be obtained in the case that not less than 10% by weight of the $RZr_4(PO_4)_6$ (R being an element of Group IIa in Periodic Table) was contained as a crystalline phase. Further, such sintered bodies could be obtained by sintering the mixtures made of materials selected form $ZrP_2O_7$, $(ZrO)_2P_2O_7$, $ZrO_2$, the phosphate of R and RO under the firing conditions shown in Table 1. FIG. 1 shows the relation between the addition of various oxides to the phosphate compound and the weight-reduced percentages, FIG. 2 being the relation between the weight % of the $RZr_4(PO_4)_6$ phase contained in the phosphate based compounds and the weight-reduced percentages of the sintered bodies. FIG. 3 shows the relation between the weight % of the $RZr_4(PO_4)_6$ phase and the dimensional change percentage of the sintered bodies.

As mentioned in the above, the heat-resisting phosphate based compound sintered bodies having smaller weight-reduced percentage and smaller dimensional change percentages during the thermal treatment in air at 1,400° C. for 100 hours can be obtained by including not less than 10% by weight of the $RZr_4(PO_4)_6$ phase into the phosphate based compound sintered bodies.

Figure 4:
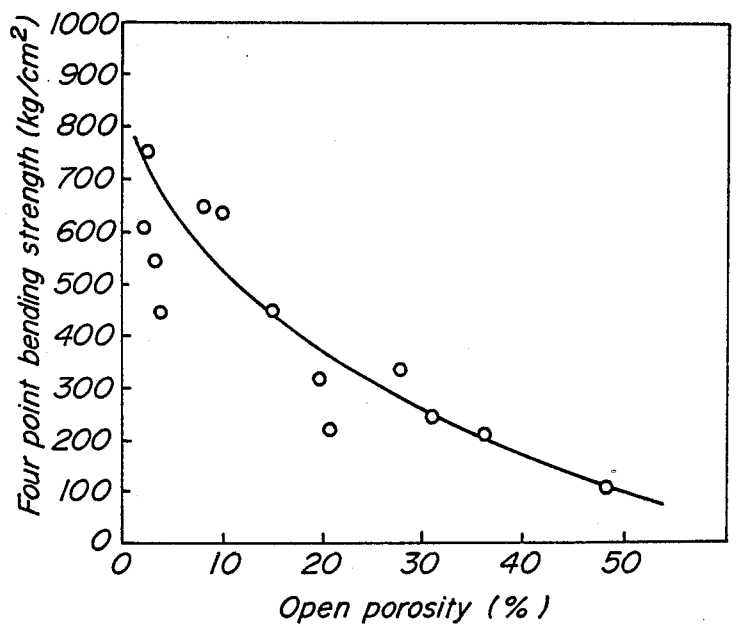
FIG. 4 is a diagram showing the relation between the open porosity and the flexural strength of phosphate based compound sintered bodies.

FIG. 4 shows a diagram showing the relation between the open porosity and the flexural strength of the phosphate based compound sintered bodies.

Further, FIG. 5 shows an X-ray diffraction pattern of the phosphate based compound sintered body of Example 3. It is seen from this diagram that $(ZrO)_2P_2O_7$ and $CaZr_4(PO_4)_6$ are contained as the crystalline phases.

As having been described in the above, according to the heat resisting phosphate based compound sintered bodies and the process for producing the same in the present invention, the heat resisting phosphate based compound sintered bodies having the weight-reduced percentage being not more than 10% by weight during the thermal treatment at 1,400° C. for 100 hours can be obtained by incorporating not less than 10% by weight of $RZr_4(PO_4)_6$ (R being an element in Group IIa of Periodic Table).

Therefore, the phosphate based compound sintered bodies according to the present invention will be applied as articles required to have heat resistance, low expansion and high temperature stability, for instance, as rotary heat regenerating type ceramic heat exchangers and heat transmission type heat exchangers when being molded into honeycomb structural bodies by extruding or the like, and as heat insulating materials in ceramic turbocharger rotor-housings and engine manifolds when being molded by slip casting pressing, injection molding or the like.

What is claimed is:

1. A heat-resisting sintered body consisting essentially of not less than 10% by weight of a crystalline phase of $RZr_4(PO_4)_6$ in which R is an element in Group IIa of the Periodic Table, and $Zr_2P_2O_9$, wherein a weight-reduced percentage of said body is not more than 10% by weight when the sintered body is thermally treated at 1,400° C. for 100 hours, and a self-weight softening percentage of said body after the thermal treatment of 1,400° C. for 5 hours is not more than 0.3%.

2. A sintered body according to claim 1, wherein R is an element selected from the group consisting of Ba, Be, Sr, Ra, and Ca.

3. A sintered body according to claim 1, wherein said body has an open porosity of not more than 50% and a bending strength of not less than 100 kg/cm$^2$.

4. A sintered body according to claim 1, wherein said body has a dimensional change percentage after the thermal treatment at 1,400° C. for 100 hours of not more than 1%.

5. A sintered body according to claim 1, wherein said body has a coefficient of thermal expansion in a temperature range from room temperature to 1,400° C. of not more than $25\times10^{-7}$/°C.

6. A sintered body according to claim 1, wherein said body is shaped as a ceramic honeycomb structure.

7. A process for producing a heat-resisting phosphate based compound sintered body, consisting essentially of a crystalline phase of $RZr_4(PO_4)_6$ in which R is an element in Group IIa of the Periodic Table, and $Zr_2P_2O_9$ said process comprising the steps of molding a batch mixture made of starting materials of $(ZrO)_2P_2O_7$,[$ZrO_2$,] a phosphate of R, and/or a source of RO in which R is an element in Group IIa of the Periodic Table, and firing the resultant molding in air at a temperature of not less than 1,500° C. for a time period of 1–24 hours.

8. A process according to claim 7, wherein R is an element selected from the group consisting of Ba, Be, Sr, Ra, and Ca.

9. A process according to claim 7, wherein the source of RO is a compound selected from the group consisting of a hydroxide, a carbonate, and a sulfate, all of which are converted into RO during firing of the sintered body.

10. A process according to claim 7, wherein said starting materials have an average grain size of not greater than 50 μm.

11. A heat-resisting sintered body consisting essentially of a crystalline phase of $RZr_4(PO_4)_6$ in which R is one element in Group IIa of the Periodic Table, wherein a weight-reduced percentage of said body is not more than 10% by weight when the sintered body is thermally treated at 1,400° C. for 100 hours, and a self-weight softening percentage of said body after the thermal treatment at 1,400° C. for 5 hours is not more than 0.3%.

12. A process for producing a heat-resisting sintered body consisting essentially of a crystalline phase of $RZr_4(PO_4)_6$ in which R is one element in Group IIa of the Periodic Table, said process comprising the steps of molding a batch mixture of $ZrP_2O_7$, source of RO and/or phosphate of R, and $Zr_2P_2O_9$ and/or $ZrO_2$, and firing the resulting molding in air in a temperature range of 1,500° to 1,600° C. for a time period of 5–10 hours.

13. A heat-resisting sintered body consisting of a crystalline phase of $RZr_4(PO_4)_6$ in which R is one element in Group IIa of the Periodic Table, wherein a weight-reduced percentage of said body is not more than 10% by weight when the sintered body is thermally treated at 1,400° C. for 100 hours, and a self-weight softening percentage of said body after the thermal treatment at 1,400° C. for 5 hours is not more than 0.3%.

14. A process for producing a heat-resisting sintered body consisting of a crystalline phase of $RZr_4(PO_4)_6$ in which R is one element in Group IIa of the Periodic Table, said process comprising the steps of molding a batch mixture of $ZrP_2O_7$, source of RO and/or phosphate or R, and $Zr_2P_2O_9$ and/or $ZrO_2$, and firing the resulting molding in air in a temperature range of 1,500° to 1,600° C. for a time period of 5–10 hours.

* * * * *